United States Patent [19]

Stephens

[11] 4,375,898

[45] Mar. 8, 1983

[54] AIR DEFLECTOR ASSEMBLY

[75] Inventor: Donald L. Stephens, Bellevue, Wash.

[73] Assignee: PaccarInc., Bellevue, Wash.

[21] Appl. No.: 172,793

[22] Filed: Jul. 28, 1980

[51] Int. Cl.³ .............................................. B62D 35/00
[52] U.S. Cl. .................................... 296/1 S; 105/2 R
[58] Field of Search .................. 296/1 S, 91, 216, 217;
105/2 R, 2 A; 244/113, 213

[56] References Cited

U.S. PATENT DOCUMENTS 3,047,259  7/1962  Tatnall ............................... 244/113
4,056,279  11/1977 Dorsch ............................... 296/1 S
4,084,846  4/1978  Wiley ................................. 296/1 S Primary Examiner—Joseph F. Peters, Jr.
Assistant Examiner—John A. Carroll
Attorney, Agent, or Firm—Seed, Berry, Vernon & Baynham

[57] ABSTRACT

An air deflector assembly for reducing aerodynamic drag on a tractor-trailer vehicle, a full truck or similar automotive vehicles which includes a deflector panel pivotally mounted above the roof of the tractor for deflecting a portion of the air flow passing over the roof upwardly and over the top of the trailer. The deflector panel is reinforced on its rear side by a stiffener having a plurality of diagonally extending segments which increases the torsional stiffness of the panel and permits the use of a single support strut. The strut, which is adjustable so as to permit the panel to be positioned in a retracted position and one or more operating positions, extends between the central portion of the stiffener and a frame mounted to the roof of the truck. Means are provided near the forward end of the frame for pivotal mounting of the deflector panel. In one embodiment of this invention the strut can be extended or retracted by an electrically powered worm drive which can be controlled from the driver's compartment.

In another embodiment the strut has two telescopically engaging members which can be locked so as to fix the position of the air deflector panel by means of a removable locking pin.

22 Claims, 9 Drawing Figures

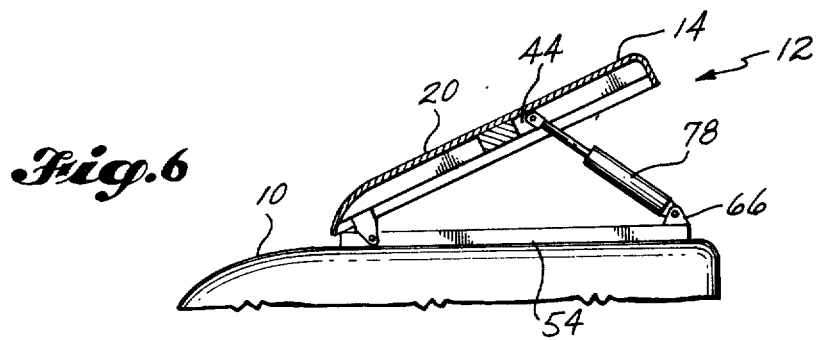
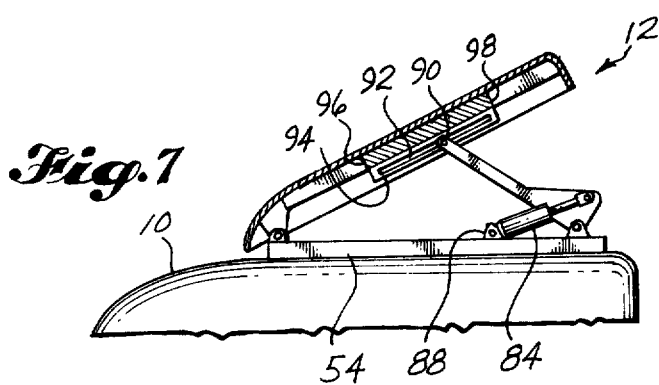
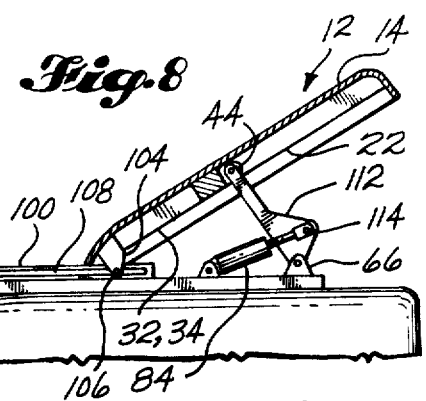
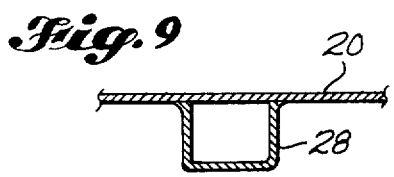
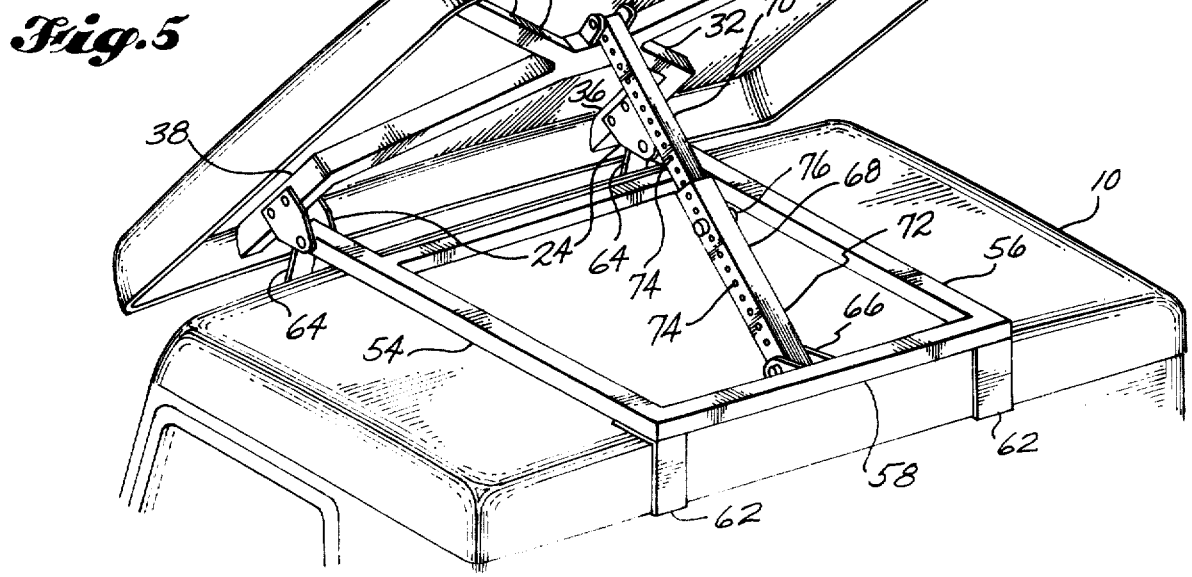

AIR DEFLECTOR ASSEMBLY

BACKGROUND OF THE INVENTION

This invention relates generally to air deflectors for reducing aerodynamic drag on tractor-trailers or similar vehicles and more particularly to an air deflector having a novel deflector panel reinforced by a stiffener to increase its torsional stiffness and permit the use of a single adjustable strut for support and adjustment of the panel.

Due to rapidly increasing fuel costs considerable attention has been given in recent years to improving the efficiency of heavy trucks. One aspect of truck design which has been given particular attention is the aerodynamic configuration of the vehicle. Traditionally, the external configuration of such trucks has been primarily determined by various functional requirements and particularly the need to maximize the volumetric load capacity of the vehicle within given height, width and length requirements. Streamlining was not a major consideration and was not generally considered to be economically justifiable, but the recent sharp increases in fuel costs have altered the economic situation. Because approximately one-half the fuel used by a typical tractor-trailer at highway speeds is spent overcoming aerodynamic drag, measurable savings in operating costs can be achieved by reducing drag on these vehicles.

Ideally this drag reduction should be accomplished without significantly increasing the costs of the vehicles and without sacrificing the advantages of present designs. It has been suggested by others that drag can be reduced by adding various types of aerodynamic control devices to the vehicles. Probably the most common such device is an air deflector which is mounted on the roof of the tractor cab such as those described in U.S. Pat. Nos. 2,863,695 to A. F. Stanm and 3,241,876 to W. S. Saunders. The purpose of these deflectors is to divert a portion of the air flowing over the tractor cab roof upwardly and over the top of the trailer so that it does not impinge on the blunt forward end of the trailer body. The optimum configuration and orientation of such deflectors depends upon a number of variables, particularly the difference in height between the cab roof and the trailer and the gap between the tractor and trailer. Accordingly a number of the deflectors currently available are adjustable to compensate for various trailer configurations. Particularly notable is the adjustable deflector described in U.S. Pat. No. 4,102,548 to T. J. Kangas which can be remotely controlled either by the driver or by an automatic control system designed to optimize the setting of the deflector.

Most of these adjustable deflectors are thin, shell-like structures which are adapted to be pivotally mounted near their forward edge to the roof of the tractor cab. Typically they are held in operating position by two or more struts or braces which extend downward from the deflector to the cab roof as illustrated in U.S. Pat. No. 3,822,910 to Wyley. One problem with using such a support system on a manually adjustable deflector is that in order to adjust it the driver must go through the rather cumbersome process of loosening, adjusting and relocking each of the support struts. Consequently the drivers will often leave the deflector in a fixed but less than optimum position after changing trailers rather than an attempt to readjust it. If the deflector is of the power driven type as described in the Kangas patent, a support system of this type results in added cost and complexity of the adjustable strut mechanism. Either the struts must be simultaneously driven by a single actuator or multiple actuators must be used. These problems would be considerably reduced by the use of a single adjustable strut to support and position the deflector, but the deflectors found in the prior art would not be adequately supported by a single strut. Most of them have relatively low torsional rigidity and probably would not withstand the asymmetric airloading imposed by cross winds or gusts. Also, there is no provision in current deflectors for mounting a centrally located strut to the panel and for carrying relatively high loads that would occur at the attachment point. Accordingly, it is an object of this invention to provide for an air deflector assembly having a novel deflector panel which is torsionally reinforced and adapted for use with a single strut. It is a further object of this invention to provide for a novel air deflector assembly which includes a reinforced deflector panel and a unitary adjustable strut which can be quickly and easily adjusted by the driver either manually or remotely with an actuator.

SUMMARY OF THE INVENTION

This invention can be broadly summarized as providing for an improved air deflector assembly for reducing aerodynamic drag on a tractor-trailer, a full truck or a similar vehicle. The air deflector assembly is described generally as having a deflector panel which is adapted to be mounted above the roof of the truck cab and which includes a stiffener having a plurality of the segments extending along the panel in generally diagonal directions and tending to increase the torsional stiffness of the panel. The assembly also includes an adjustable strut which is attached to the panel and permits movement thereof between a retracted position and one or more operating positions.

In accordance with the more detailed aspect of this invention the air deflector includes a stiffener which is attached to the raised above the rear surface of the panel and has a reinforced central section located near the geometric center of the panel which adjoins each of the diagonally extending segments of the stiffener.

In accordance with a yet more detailed aspect of the invention, at least one of the stiffener segments extends proximate the forward edge of the panel and the assembly includes means for pivotally mounting the panel to the roof attached to the stiffener near the forward edge of the panel.

In one embodiment the panel is adjusted using a powered worm drive assembly which can be remotely controlled by the driver. In this embodiment the adjustable strut includes a jack screw which engages the worm drive.

In another embodiment, the air deflector assembly is manually adjustable by the driver. In this embodiment the adjustable strut includes two telescopically engaging sections and a means for locking one of the sections with respect to the other so as to fix the position of the panel.

BRIEF DESCRIPTION OF THE DRAWINGS

FIG. 5 is a perspective view of the upper portion of a truck cab on which a second embodiment of the present invention has been installed.

FIGS. 6 through 8 are schematic side views of the three additional embodiments of the present invention in which three different means for adjusting the deflector panel are illustrated.

FIG. 9 is a cross-sectional view taken at 9—9 in FIG. 2.

DESCRIPTION OF PREFERRED EMBODIMENT

Figure 1:
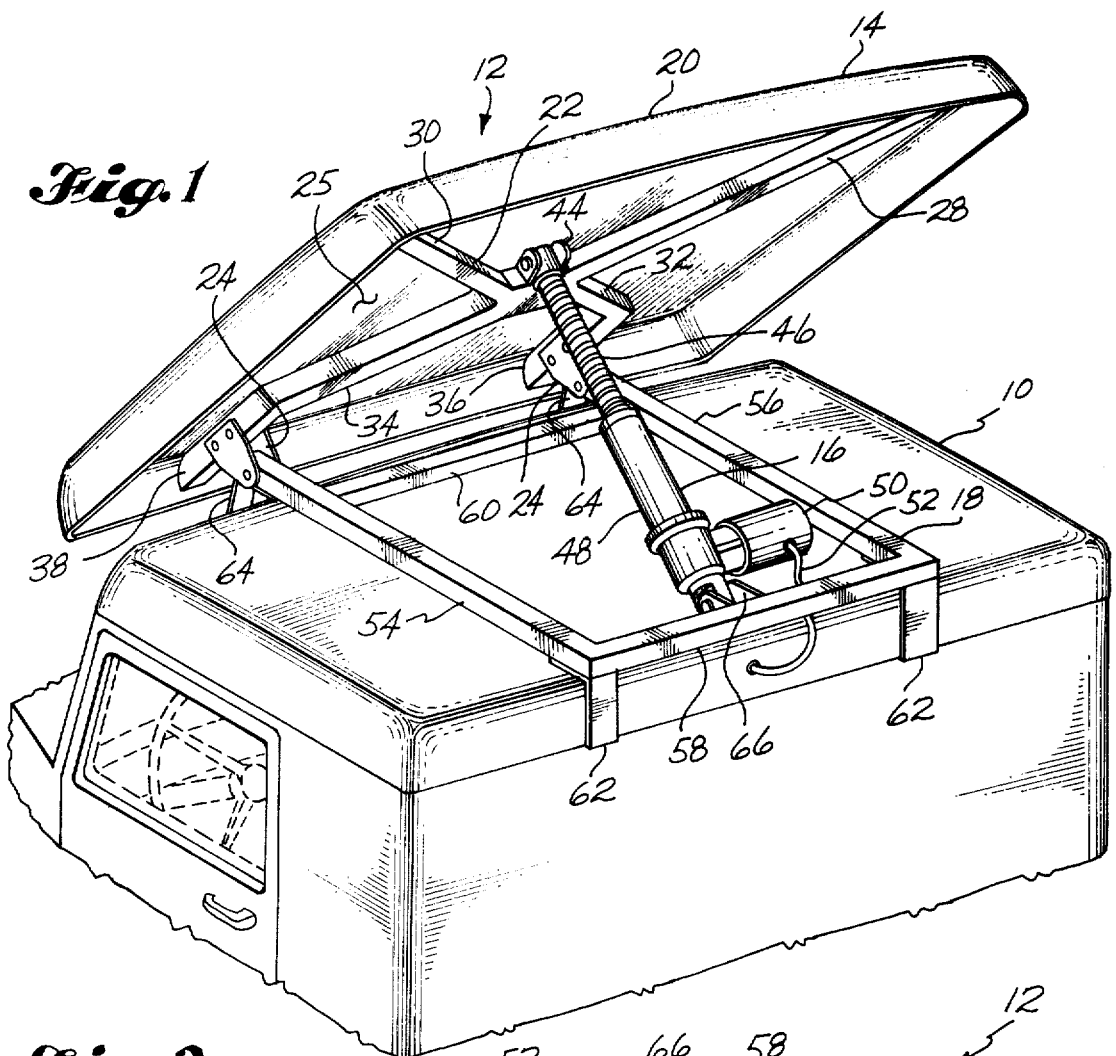
FIG. 1 is a perspective view of the upper portion of a truck cab on which one embodiment of the present invention has been installed.
Figure 2:
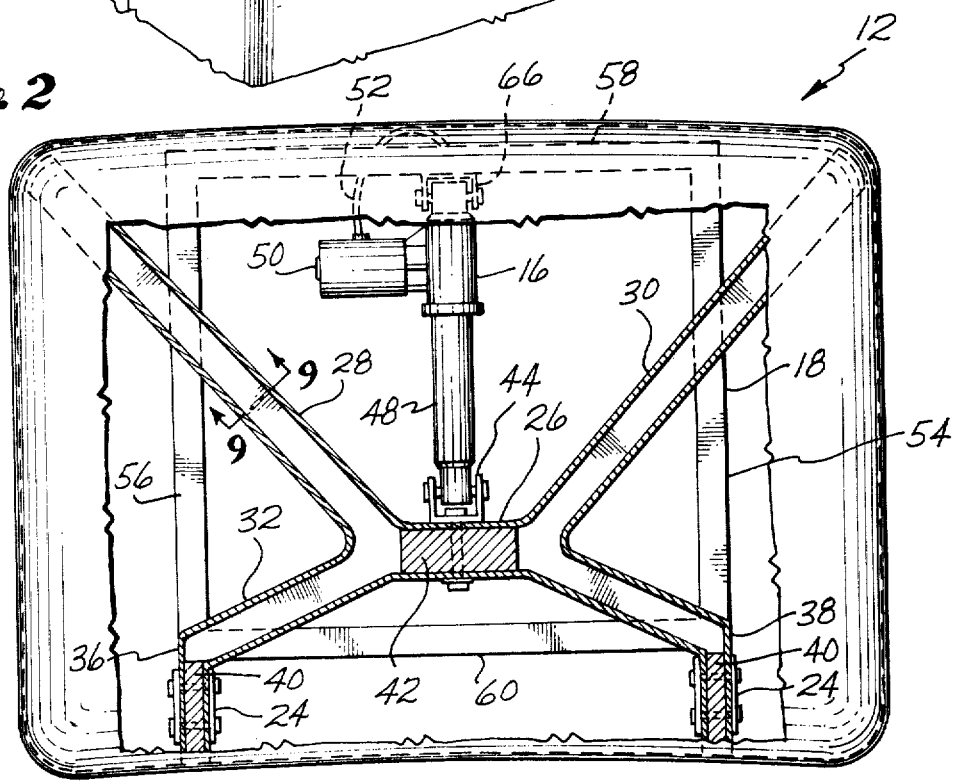
FIG. 2 shows a top view of the embodiment of FIG. 1 partially broken away.
Figure 3:
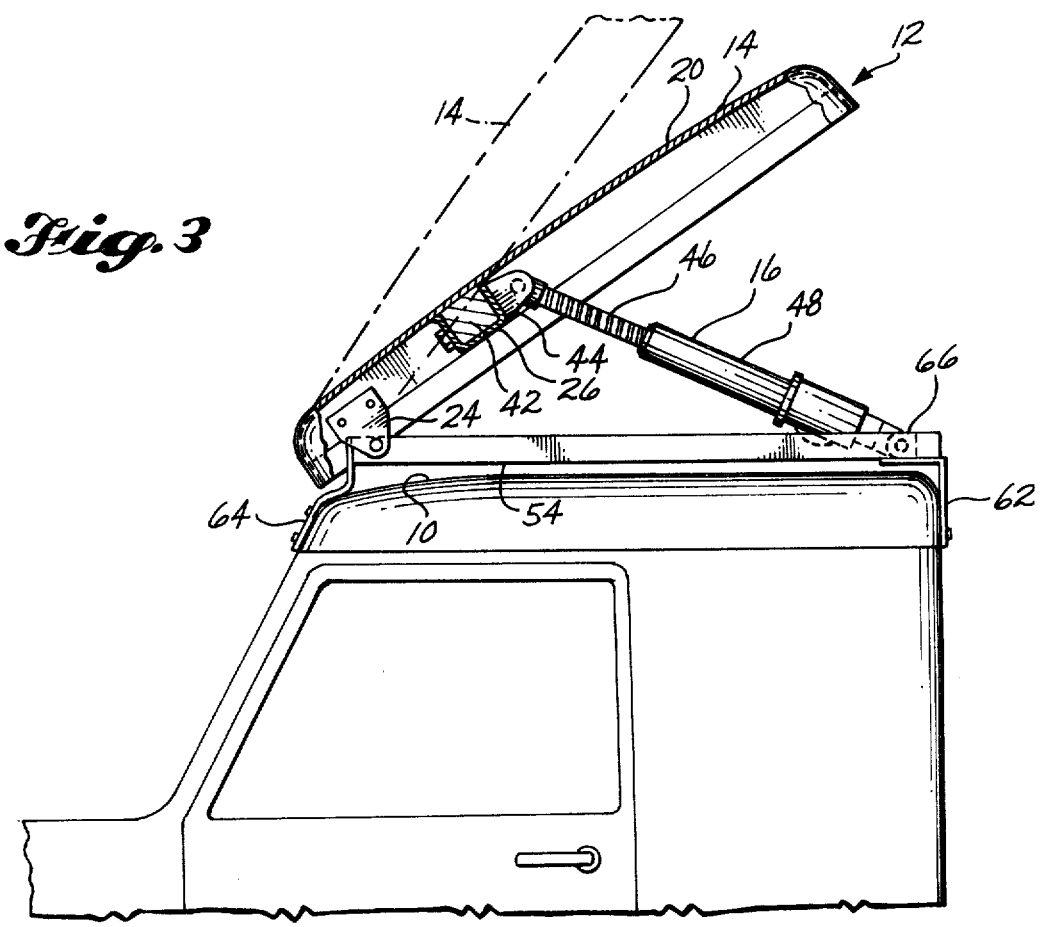
FIG. 3 shows a side view of the embodiment of FIG. 1 partially broken away where the deflector is shown in two typical operating positions.
Figure 4:
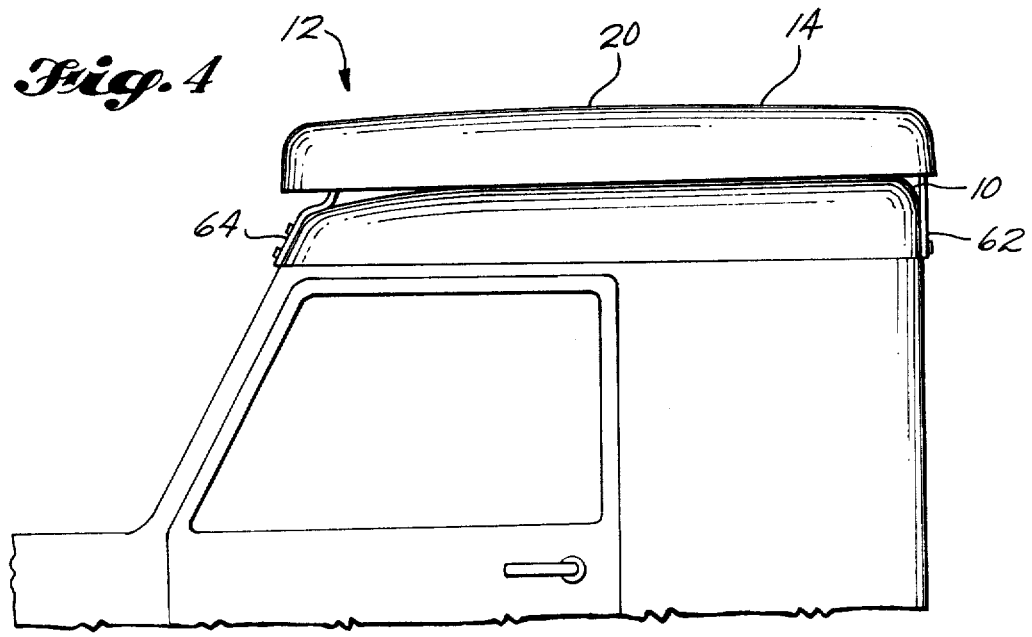
FIG. 4 is a side view of the embodiment of FIG. 1 showing the deflector in a retracted position.

The novel features I believe to be characteristic of this invention are set forth in the appended claims, but the invention itself may be best understood and its various objects and advantages best appreciated by reference to the following detailed description and the accompanying drawings. In FIGS. 1 through 4 of those drawings, one embodiment of the present invention is shown mounted to the roof 10 of the cab or driver's compartment of a conventional truck tractor. The air deflector assembly, generally designated by the numeral 12, includes the deflector panel 14, adjustable strut assembly 16 and frame 18. The deflector panel itself is smoothly contoured on its forward or upstream side 20 and is generally rectangular when viewed from the top. It is preferably made of fibreglass but may be made of other suitable materials such as aluminum. The upper outer edges have been rounded to provide a relatively smooth aerodynamic surface and the panel has been generally shaped to confrom to the contours of cab roof 10 when it is in the retracted position shown in FIG. 4.

It should be understood that while a conventional type tractor has been used for purpose of illustration this invention is equally suitable for use on cabover tractors, full trucks and other similar vehicles where there is an abrupt change in the external configuration of the vehicle. Further it should be apparent that the contours of the deflector panel can be modified to conform to various other roof designs or to alter its aerodynamic performance. For example, the aft portion of the panel might be curved upward similar to the one illustrated in the Kangas patent.

A particularly significant aspect of the deflector panel is stiffener 22 which has a number of functions. It is intended to provide the necessary structural reinforcement for the shell-like panel and particularly to provide the panel with added torsional rigidity. It also provides suitably strong attachment points for adjustable strut 16 and pivot plates 24. The stiffener is preferably of one piece fibreglass construction and is integrally molded to the rear side 25 of the panel during manufacture. It has a center section 26 which is located near the geometric center of the deflector panel and four segments 28, 30, 32 and 34 which extend diagonally outward from the center section toward the corners of the panel.

In the cross-sectional view of FIG. 9 it can be seen that segment 28, which is typical of the four segments, is a hollow channel section. Lower segments 32 and 34 have forward portions 36 and 38 respectively which are generally aligned in a fore and aft direction and are adapted to receive pivot plates 24. Each of these sections is reinforced with a wooden core 40 and the plates are mounted to them with bolts or other suitable fasteners as shown. Center section 26 is also a u-shaped channel section but has been reinforced with wooden core 42 to carry the load imposed on it by strut 16. The strut is pivotally attached to actuator bracket 44 which is securely bolted to the center section.

Adjustable strut 16 includes jackscrew 46, housing 48 and electric worm drive 50. The details of a worm drive actuator of this type are well known to those of ordinary skill and will not be described in detail. Power to the actuator is supplied by cable 52 which is connected to a three position control switch (not shown) mounted in a convenient position within the truck cab. With this control system the driver can easily position the deflector to any desired operating position within the operating range of the unit either when the truck is at rest or in motion.

Support for the deflector panel and the strut is provided by frame 18 which includes side rails 54 and 56, rear member 58 and crossmember 60. Rear brackets 62 and forward brackets 64 are used to secure the frame to the cab roof. Each of the pivot brackets 24 is rotatably connected to the forward end of an associated side rail and the lower end of strut 16 is pivotally mounted to the lower actuator bracket 66.

A second embodiment of this invention is illustrated in FIG. 5. In this embodiment the deflector panel and frame are identical to those shown in FIGS. 1 through 4 but the power driven strut has been replaced with a manually adjustable one. Strut 68 has an upper member 70 which is pivotally mounted at its upper end to bracket 44 and telescopically engages lower member 72. Lower member 72 is pivotally mounted to the frame at bracket 66. Each of the members has a plurality of opposing pairs of holes 74 in its sides for receiving locking pin 76. In order to adjust the shield in any desired position the driver can simply remove the locking pin, raise the shield by hand to the desired position, and replace the pin.

In FIGS. 6 through 8 three alternate means for actuating the air deflector has been illustrated schematically. In FIG. 6 a double acting pneumatic cylinder 78 has been substituted for the electrically powered worm drive actuator of FIG. 1. As with the embodiment of FIG. 1 the actuator is pivotally mounted to the deflector panel at bracket 44 and to the frame at bracket 66.

FIG. 7 illustrates another arrangement in which a pivoting arm is used to position the deflector. In that embodiment arm 80 is pivotally mounted to bracket 82 on rear frame member 58. Actuator 84, preferably an electrically powered worm drive unit similar to the one shown in FIG. 1, is pivotally mounted at one end to point 86 on the arm and on the other to bracket 88 on the frame. In order to centrally locate bracket 88 within the frame an additional crossmember (not shown) similar to crossmember 60 must be added to the frame structure. Upper end 90 of the arm is slideably mounted in slot 92 of slide bracket 94 which is mounted to stiffner 22. In order to mount the slide bracket to the stiffener, crossmembers 96 and 98 must be mounted between segments 28 and 30 and segments 32 and 34 respectively of the stiffener. In operation, when actuator 84 is extended arm 80 rotates in a clockwise direction and raises the deflector.

In FIG. 8 another embodiment of this invention is shown in which the deflector is slideably attached near its forward end to guides 100 and 102 which are mounted on side rails 54 and 56 respectively of the frame. Pivot plates 24 have been replaced with slide brackets 104 which are bolted in pairs to the forward ends of stiffener segments 32 and 34 respectively. Pins 106, inserted between each pair of slide brackets, permit the deflector panel to translate in a fore and aft direction and to rotate in slots 108 and 110 (not shown). As with the embodiment of FIG. 7 actuator 84 is pivotally mounted at one end to bracket 88 located on an added frame crossmember (not shown) and on its other end to arm 112 at point 114. Arm 112 is pivotally mounted to bracket 66 on the frame. In operation when the driver extends the actuator, arm 112 is rotated in a clockwise direction causing the shield to translate to the rear and rotate counterclockwise into a raised position. Thus it can be seen that the present invention provides for an improved air deflector assembly which incorporates many novel features and offers significant advantages over the prior art. Although only five specific embodiments of this invention have been illustrated and described it is to be understood that obvious modifications can be made in them without departing from the true scope and spirit of the invention.

What is claimed is:

1. An air deflector assembly for reducing aerodynamic drag on a tractor-trailer vehicle or the like, comprising:
   a deflector panel being substantially rectangular in top plan view and adapted to be pivotally mounted above the roof of said tractor, said panel including a stiffener having a plurality of intersecting segments extending along said panel in generally diagonal directions toward respective corners of said panel and tending to increase the torsional stiffness of said panel; and
   a single, adjustable strut engaging said panel near the intersection of said segments and permitting said panel to be moved between a retracted position and one or more operating positions.

2. The air deflector assembly of claim 1 wherein the plurality of segments of said stiffener intersect in a central section disposed proximate the geometric center of said panel.

3. The air deflector assembly of claim 1 wherein said diagonally extending, intersecting segments adjacent the forward edge of said panel each includes a lower segment which extends away from the diagonal toward the forward edge of the panel substantially perpendicular to the forward edge of said panel and wherein said panel further includes means attached to each lower segment and located proximate said forward edge for pivotally mounting said panel to said roof to provide a three-point support for the panel.

4. The air deflector assembly of claim 3 wherein each of said plurality of intersecting segments adjoins and extends outwardly from said central section.

5. The air deflector assembly of claim 1 wherein said stiffener is attached to and raised above the rear surface of said panel.

6. The air deflector assembly of claim 3, further including power means for moving said strut so as to selectively position said deflector panel.

7. The air deflector assembly of claim 3 wherein said strut has a first section, a second section telescopically engaging said first section and means for locking said first section with respect to said second section so as to fix the position of said deflector panel.

8. The air deflector assembly of claim 1 further including a frame for supporting said deflector panel adapted to be mounted to the roof of said tractor, said frame including means for pivotal mounting of said deflector panel and means for attaching said strut.

9. The air deflector assembly of claim 3 wherein said strut includes a jackscrew and wherein said power means includes a worm drive assembly adapted to engage jackscrew.

10. The air deflector assembly of claim 3 wherein said power means includes a hydraulic cylinder pivotally mounted at one end to said central section of said panel.

11. The air deflector assembly of claim 3 wherein said strut slideably engages said panel at one end and wherein said power means is adapted to rotate said strut to position said panel.

12. The air deflector assembly of claim 3 wherein said panel is slideably mounted at the forward edge thereof to said tractor roof, said strut is pivotally mounted to said panel and said power means is adapted to rotate said strut to position said panel.

13. An air deflector assembly for reducing aerodynamic drag on a tractor-trailer vehicle or the like, comprising:
   a deflector panel being substantially rectangular in top plan view and adapted to be pivotally mounted above the roof of said tractor, said panel including a stiffener having a central section and a plurality of segments extending from the central section along said panel in generally diagonal directions toward respective corners of said panel and tending to increase the torsional stiffness of said panel; and
   a single, adjustable strut engaging said panel proximate the geometric center thereof and permitting said panel to be moved between a fully retracted position and one or more operating positions; and
   power means for moving said strut so as to selectively position said deflector panel.

14. The air deflector assembly of claim 13 wherein each segment extending diagonally toward the forward edge of said panel includes a lower segment which extends away from the diagonal toward the forward edge of said panel substantially perpendicular to the forward edge of said panel, and wherein the panel further includes means attached to each lower segment and located proximate said forward edge for pivotally mounting said panel to said roof.

15. An air deflector assembly for reducing aerodynamic drag on a tractor-trailer vehicle or the like, comprising:
   a deflector panel being substantially rectangular in plan view and adapted to be pivotally mounted above the roof of said tractor, said panel including a stiffener having a reinforced center section and a plurality of segments extending from said central section along the rear side of said panel in generally diagonal directions toward respective corners of said panel and tending to increase the torsional stiffness of said panel; and
   a single, adjustable strut pivotally mounted to said central section of said stiffener and permitting said panel to be moved between a fully retracted position and one or more operating positions, said strut including a jackscrew; and
   power means for moving said strut so as to selectively position said deflector panel, including a worm drive assembly adapted to engage said jackscrew; and a frame for supporting said deflector panel, said frame including means for pivotal mounting of said deflector panel, means for attaching said strut, and means for mounting said frame to the roof of said tractor.

16. The air deflector assembly of claim 14, further including means located within the driver compartment of said tractor for controlling said power means.

17. An air deflector assembly for reducing aerodynamic drag on a tractor-trailer vehicle or the like, comprising:
   a deflector panel being substantially rectangular in plan view and adapted to be pivotally mounted above the roof of said tractor, said panel including a stiffener having a reinforced central section and a plurality of segments extending from said central section along the rear side of said panel in generally diagonal directions toward respective corners of said panel and tending to increase the torsional stiffness of said panel; and
   a single, adjustable strut pivotally mounted to said central section of said stiffener and permitting said panel to be moved between a fully retracted position and one or more operating positions, said strut including a first section, a second section telescopically engaging said first section and means for locking said first section with respect to said second section so as to fix the position of said deflector panel; and
   a frame for supporting said deflector panel, said frame including means for pivotal mounting of said deflector panel, means for attaching said strut, and means for mounting said frame to the roof of said tractor.

18. The air deflector assembly of claims 15 or 17 wherein said frame includes a pair of side members extending in a generally fore and aft direction above the roof of said tractor and adapted at their forward ends for pivotal mounting of said deflector panel, a rear member extending transversely between said side members, and means located near the center of said rear member for pivotal mounting of said strut.

19. An air deflector panel for reducing aerodynamic drag on a tractor-trailer vehicle or the like adapted to be pivotally mounted above the roof of said tractor, said panel comprising:
   a panel member being substantially rectangular in top plane view for upwardly deflecting a portion of the air passing over the roof of said tractor; and
   a stiffener attached to said panel member and having a plurality of intersecting segments extending along said panel member in generally diagonal directions, intersecting near the geometric center of said panel, and tending to increase the torsional stiffness of said panel.

20. The air deflector panel of claim 19 wherein said intersecting segments each includes, adjacent the forward edge of said panel member, a lower segment which extends toward the forward edge of said panel member and wherein said panel further includes means located proximate said forward edge and laterally spaced therealong and attached to said lower segments for pivotally mounting said panel to said roof.

21. The air deflector panel of claim 17 wherein the intersecting segments of said stiffener intersect in a reinforced central section disposed proximate the geometric center of said panel member adjoining said segments.

22. The air deflector panel of claim 19 wherein said stiffener is attached to and raised above the rear surface of said panel member.

* * * * *